United States Patent [19]

Kuhlen et al.

[11] 4,281,586

[45] Aug. 4, 1981

[54] PNEUMATICALLY OPERATED ADJUSTING DEVICE

[75] Inventors: Ernst Kuhlen, Willich; Gunther Frohberg, Neuss, both of Fed. Rep. of Germany

[73] Assignee: Pierburg GmbH & Co. KG, Neuss, Fed. Rep. of Germany

[21] Appl. No.: 55,293

[22] Filed: Jul. 5, 1979

[30] Foreign Application Priority Data

Jul. 13, 1978 [DE] Fed. Rep. of Germany ....... 2830738

[51] Int. Cl.[3] .......................... F01B 7/20; F01B 19/00; F16J 3/02; F15B 13/044

[52] U.S. Cl. .......................................... 91/52; 91/173; 91/459; 92/24; 92/95; 92/100

[58] Field of Search ................... 92/24, 27, 30, 29, 99, 92/64, 100; 91/52, 459, 173, 167 R

[56] References Cited

U.S. PATENT DOCUMENTS

| | | | |
|---|---|---|---|
| 2,015,374 | 9/1935 | Baker | 91/52 |
| 2,163,982 | 6/1939 | Mercier | 92/24 |
| 2,361,206 | 10/1944 | Hoppe | 91/52 |
| 2,465,714 | 7/1949 | Elliott | 92/100 |
| 2,585,837 | 2/1952 | Randol | 92/27 |
| 3,437,014 | 4/1969 | Deibel et al. | 92/30 |
| 4,111,099 | 9/1978 | Fischer | 92/100 |
| 4,181,065 | 1/1980 | Benjamin | 91/167 R |

*Primary Examiner*—Paul E. Maslousky

*Attorney, Agent, or Firm*—Haseltine and Lake

[57] ABSTRACT

A pneumatically actuated adjusting device, particularly for throttle flap adjustment on mixture-compressing combustion engines, with a diaphragm held between a housing upper portion and a housing lower portion. This diaphragm forms a vacuum-charged working chamber with the housing upper portion. With the housing lower portion it forms a chamber open to ambient atmosphere. A guide bushing projects from the housing upper portion on the atmosphere vented side of the diaphragm and is rigidly connected to it. The diaphragm is also rigidly connected to two concentric spaced diaphragm plate pairs. The outer diaphragm plate pair is connected to a pipe moving inside the guide bushing. This pipe has one or several recesses, with a ball in every recess. Indentations in the guide bushing have diameters corresponding to the ball diameter, with the depth determining the stroke of the first adjustment stage. The inner diaphragm is rigidly connected to a control piston inside the pipe. This control piston has a recess. After moving the ball into recess, the stroke of the pipe is lengthened. The pipe may project outwardly through the guide bushing from the housing and is loaded by a compression spring in a direction opposite to the applied vacuum pressure.

7 Claims, 1 Drawing Figure

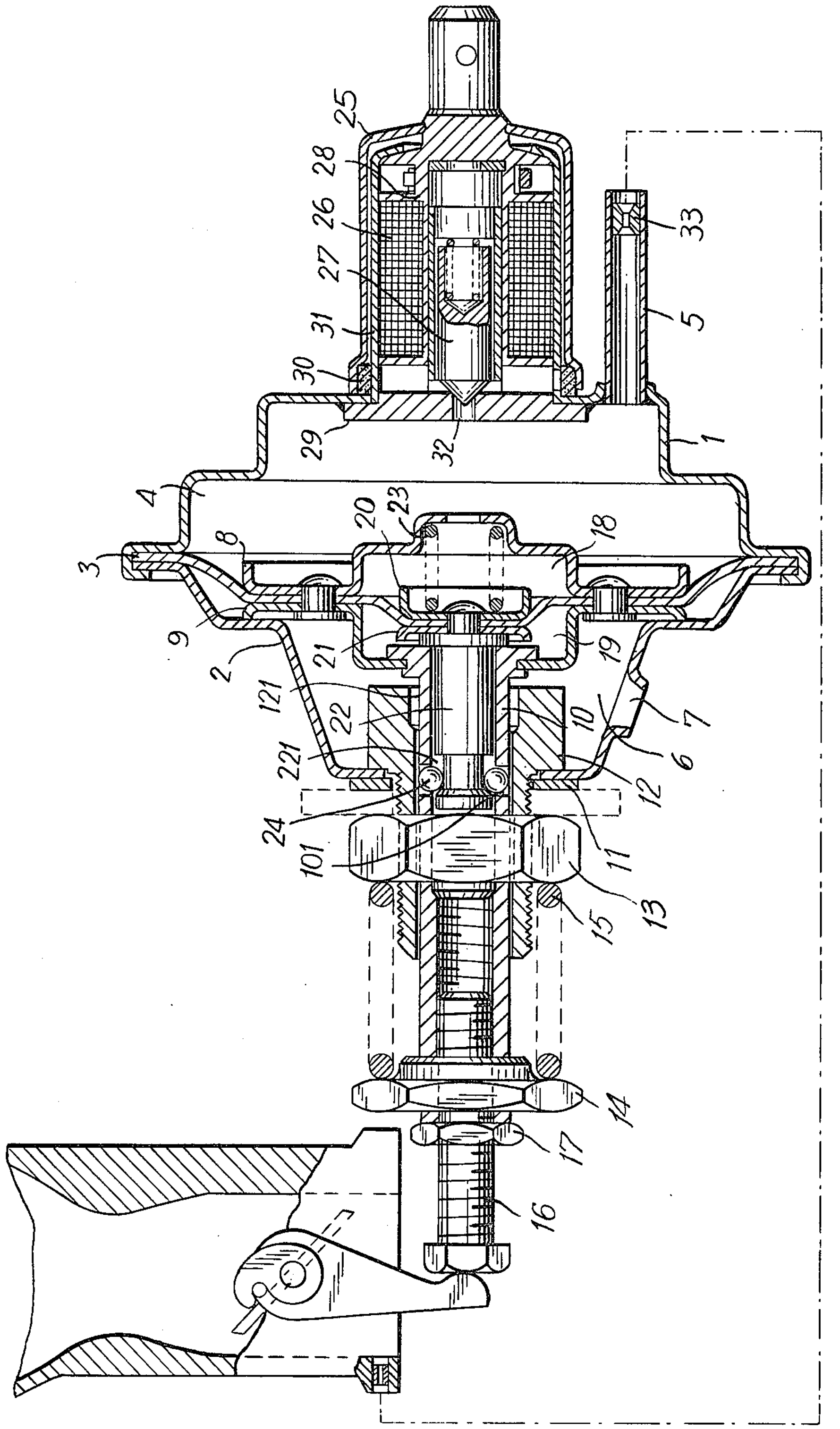
25
28
26
27
31
30
29
32
33
5
1
4
3
8
20
23
18
9
2
21
19
121
22
10
7
221
6
12
24
101
11
13
15
14
17
16

PNEUMATICALLY OPERATED ADJUSTING DEVICE

BACKGROUND OF THE INVENTION

The present invention relates to a pneumatically operated adjusting device, particularly for throttle flap adjustment with mixture compressing combustion engines, with a diaphragm held between a housing upper portion and a housing bottom portion. This diaphragm forms a vacuum-charged working chamber with the housing upper portion. With the housing bottom portion, this diaphragm forms a space open to the ambient atmosphere. The device has a guide bushing which projects from the housing bottom on the side of the diaphragm exposed to the atmosphere and is permanently connected to this housing bottom.

On motor vehicles with mixture-compressing combustion engines, which use devices actuated by intake pipe vacuum or use intake pipe vacuum as energy source (automatic drive, air conditioner), there arises the problem that when adding one of these loads, the effective intake pipe vacuum no longer meets the requirements for trouble-free operation of the engine. In order to compensate for this shortcoming, the throttle flap position is changed, increasing engine speed and restoring a desired idling condition. If now a second load of the aforementioned type is connected to the system, a renewed re-adjustment of the throttle flap is required.

An arrangement of this type is known from the German Laid-Open Document No. 26 24 420. With this continuously operating arrangement, a diaphragm unit acting on the throttle flap via a linkage the intake pipe vacuum pressure is applied as control pressure. This pressure simultaneously acts on a barometer unit which actuates a plunger; this plunger acts as movable stop for a valve located in the center of the diaphragm for venting the control pressure chamber to atmosphere. This should result in a stroke restriction on the diaphragm corresponding to the intake pipe vacuum pressure. The purpose of this arrangement is to enlarge the opening of the throttle flap when adding vacuum pressure loads.

In the installation of an automatic transmission, a certain engine speed may not be exceeded during idling since otherwise the vehicle starts to move. Therefore the maximum opening of the throttle flap must be adjusted by an adjustable mechanical stop. Thus, the stroke of the diaphragm must be limited by design.

The known arrangement could meet this requirement, but has the disadvantage that, when adding an additional load, the diaphragm assumes an intermediate position which cannot be fixed mechanically. It vibrates about this position by brief opening and closing of the valve located in the center. With this arrangement, a reproducible speed cannot be generated upon adding the second load. Also, there is the danger that the engine speed fluctuates uncontrollably.

It is the object of the present invention to provide an arrangement which ensures reproducible speeds when adding two loads consuming vacuum pressure and eliminates the uncontrolled fluctuation of the engine speed.

Another object of the present invention is to provide an arrangement of the foregoing character which is substantially simple in construction and may be economically fabricated.

A further object of the present invention is to provide an adjusting device as described which may be readily maintained in service and which has a substantially long operating life.

SUMMARY OF THE INVENTION

The objects of the invention are achieved by providing an arrangement of the above type rigidly connecting the diaphragm with two concentric spaced diaphragm plate pairs, rigidly connecting the outer diaphragm plate pair to a pipe displaceable in the guide bushing, placing a ball in every recess, providing a dip in the guide bushing with diameters accommodating these balls and with depths determining the stroke of the first adjustment stage, rigidly connecting the inner diaphragm plate pair (20, 21) with a control piston (22) displaceably arranged in the pipe (10) connected to the outer diaphragm plate pair (8, 9), providing this control piston with a recess, and having the pipe (10) connected to the outer diaphragm plate pair (8, 9) perform a lengthened stroke after moving the ball (24).

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

A sectional view through the arrangement of the present invention.

DESCRIPTION OF THE PREFERRED EMBODIMENT

Referring to the FIGURE, there is shown a pneumatic adjusting device in accordance with the invention. A diaphragm 3 has been placed between the housing upper portion 1 and the housing lower portion 2. The connection 5 to which the vacuum pressure actuating the device is attached. The space 6 enclosed by diaphragm 3 and housing bottom portion 2 is connected through an opening 7 or several openings to the outside atmosphere. The two diaphragm plates 8 and 9 are rigidly connected to the diaphragm 3. Diaphragm plate 9 in turn is rigidly connected to pipe 10 which projects to the outside through a guide bushing 12 located in an opening 11 of the housing bottom portion 2. In its lower portion which projects to the outside from the housing bottom portion 2, this guide bushing has a thread. By means of a nut 13 on this thread, the device is mounted on a plate. The pipe 10, connected to the diaphragm plate 9, projects outside the housing from the guide bushing 12. At this end, this pipe has both an inside and an outside thread. The outside thread mounts a nut 14 which holds a compression spring 15 whose other end rests against nut 13 on guide bushing 12. A screw 16 is threaded into the inside thread of pipe 10 and secured with a counter nut 17. The diaphragm plates 8 and 9 are formed in the region of the axis of the device so that they form two small working chambers 18 and 19 separated by diaphragm 3, with chamber 18 connected to chamber 4 via an opening in the diaphragm plate 8. In this region, a control piston 22 is rigidly connected to diaphragm 3 via the small diaphragm plates 20 and 21. This control piston extends into the pipe 10. A compression spring 23 is seated between the small diaphragm plate 20 and the large diaphragm plate 8.

The function of the device is as follows:

The undisturbed vacuum pressure prevails at connection 5, for example, the intake pipe vacuum pressure of a mixture-compressing combustion engine. Because of the pressure differential between chambers 4 and 5, the diaphragm is curved towards the vacuum pressure side to such an extent that the bent-up rim of diaphragm plate 8, which serves as stop, to ensure a specific end position, contacts housing upper portion 1. Since there is a fixed connection of these parts to diaphragm 3, the movable parts, i.e., the pipe 10 and the screw 16 are placed into their end position against the force of spring 15. When using the device as throttle flap adjuster, tolerance compensation may be made at this end position via screw 16 and an idling adjustment via nut 14. If a first load is connected into the vacuum pressure system, for example, the automatic transmission, the vacuum pressure which is connected to connection 5 and prevails in chamber 4, drops. Because of the smaller pressure differential between chamber 4 and 6 the compression spring 15 moves pipe 10 and the diaphragm 3 connected thereto downward. Pipe 10 is displaced in the guide bushing 12 to such an extent that the balls 24 distributed in recesses 101 of pipe 10 contact the bottom of the indentation 121 in the guide bushing 12. The evasion of balls 24 towards the inside is prevented by the thicker section of control piston 22.

The pre-tension of the compression spring 23 determining the position of control piston 22 is designed so that the change of the pressure differential in the small working chambers 18 and 29 due to the applied first load does not yet cause a shift of the membrane and of the control piston. If, due to adding a second vacuum pressure load, for example, the air conditioner, there is a renewed drop of the intake pipe vacuum pressure and hence a reduction of the pressure differential between chambers 4 and 6, or 18 and 19, spring 23 forces diaphragm 3 and the connected control piston until the recess 221 of the control piston is next to balls 24. As a result, the balls 24 slide inward and no longer are in contact with the bottom of indentation 121 in the guide bushing 12. Hence the pressure differential, acting on diaphragm 3, between chambers 4 and 6 cause a further shift of the diaphragm 3 and the connected pipe 10. This provides a second adjustment step. This second shift of the diaphragm is restricted by the fact that the diaphragm plate 9 makes contact with the housing bottom portion 2. When the vacuum pressure change due to adding a second load is relatively small, the spring 23 would have to be subject to uneconomically high requirements on its properties, particularly the spring characteristic. Therefore the device is supplemented by an electromagnetic valve 25. During the first step, when applying the first load, the operation of the device is as described. If a second load is added, an electrical contact is actuated, for example, by the shifting of the automatic transmission or the switching-on of the air conditioner which actuates the electromagnetic valve. The valve closure member 27, located in the coil 26 and coil body 28 of the valve is lifted off its sealing contact with the plate 29 which is rigidly and tightly connected to the housing upper portion, and the flow from the outside atmosphere through a filter element 30 of valve 25 and through a central opening 32 in the plate 29 into space 4 is allowed to proceed; in the absence of load on the valve, this opening 32 is blocked by the valve closure member 27. This results in a rapid decrease of the vacuum pressure prevailing in this chamber 4 and the vacuum pressure in chamber 18. The further functioning of the device is in accordance with the above.

The vacuum pressure 5 has a throttling position 33 which keeps the outflow lower than the inflow through the valve-controlled connection between atmosphere and working chamber 4.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A pneumatically actuated adjusting device, particularly for throttle flap adjustment on mixture compressing combustion engines, comprising: a housing upper portion and housing lower portion, a diaphragm held between said housing upper portion and said housing lower portion, said diaphragm forming with said housing upper portion a vacuum-charged working chamber, said diaphragm forming with said housing lower portion a chamber open to ambient atmosphere; a guide bushing projecting on an atmosphere-vented side of said diaphragm from said housing lower portion and connected rigidly thereto; two concentric spaced diaphragm plate pairs rigidly connected to said diaphragm, a pipe displaceable in said guide bushing, said pipe being rigidly connected to an outer one of said diaphragm plate pairs, said pipe having a guided portion with at least one recess, a ball arranged in each recess, said guide bushing having an indentation with a diameter corresponding to said ball, said indentation having a depth determining a stroke of a first adjustment stage, a control piston rigidly connected to an inner one of said diaphragm plate pairs and being displaceably arranged in said pipe, said control piston having a piston recess, said pipe performing a lengthened stroke after moving said ball into said piston recess.

2. A device as defined in claim 1 including a compression spring loading said pipe oppositely to the direction of applied vacuum pressure, said pipe projecting outwardly through said guide bushing from said housing lower portion.

3. A device as defined in claim 1 including an adjustment nut for adjusting pre-tension of said compression spring.

4. A device as defined in claim 1 wherein said pipe has an adjustment screw secured by a counter nut on a side facing away from said diaphragm.

5. A device as defined in claim 1 including: an electromagnetically actuated valve attached to said housing upper portion, an opening between said working chamber and ambient temperature, said opening being controlled by said valve.

6. A device as defined in claim 5 including a filter element for protecting said opening against contamination.

7. A device as defined in claim 5 including: a vacuum pressure connection having a throttling location for keeping outflow smaller than inflow through a valve-controlled connection between ambient atmosphere and said working chamber.

* * * * *